(12) United States Patent
Pretty

(10) Patent No.: US 11,591,935 B2
(45) Date of Patent: Feb. 28, 2023

(54) FLUID DRAIN SYSTEM FOR AN AIRCRAFT PROPULSION SYSTEM

(71) Applicant: Rohr, Inc., Chula Vista, CA (US)

(72) Inventor: Sean Pretty, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/038,352

(22) Filed: Sep. 30, 2020

(65) Prior Publication Data

US 2021/0207498 A1   Jul. 8, 2021

Related U.S. Application Data

(60) Provisional application No. 62/907,829, filed on Sep. 30, 2019.

(51) Int. Cl.

| | | |
|---|---|---|
| F01D 25/32 | (2006.01) | |
| F01D 9/06 | (2006.01) | |
| F02C 7/22 | (2006.01) | |
| F02C 7/232 | (2006.01) | |
| B64C 1/14 | (2006.01) | |
| F02C 7/06 | (2006.01) | |
| F02C 7/12 | (2006.01) | |

(52) U.S. Cl.
CPC ............ *F01D 25/32* (2013.01); *B64C 1/1453* (2013.01); *F01D 9/065* (2013.01); *F02C 7/22* (2013.01); *F02C 7/232* (2013.01); *F05D 2220/323* (2013.01); *F05D 2260/20* (2013.01); *F05D 2260/601* (2013.01); *F05D 2260/602* (2013.01); *F05D 2260/606* (2013.01); *F05D 2260/6022* (2013.01); *F05D 2260/98* (2013.01)

(58) Field of Classification Search
CPC .... F01D 25/32; F01D 9/065; F05D 2260/602; F05D 2260/6022; F02C 7/232; F16N 31/00; F01P 11/0276
See application file for complete search history.

(56) References Cited

U.S. PATENT DOCUMENTS

| | | | | |
|---|---|---|---|---|
| 3,556,444 A | * | 1/1971 | Kopp | F02C 7/00 244/135 R |
| 3,841,089 A | * | 10/1974 | Clark | F02C 9/26 137/202 |
| 4,163,366 A | | 8/1979 | Kent | |
| 4,182,119 A | * | 1/1980 | Hurley | F01D 17/085 60/226.1 |
| 5,655,732 A | | 8/1997 | Frank | |

(Continued)

FOREIGN PATENT DOCUMENTS

FR    2907099 B1    5/2009

OTHER PUBLICATIONS

EP search report for EP20199444.9 dated Feb. 23, 2021.

*Primary Examiner* — Richard A Edgar
*Assistant Examiner* — Michael K. Reitz
(74) *Attorney, Agent, or Firm* — Getz Balich LLC

(57) ABSTRACT

An assembly is provided for an aircraft propulsion system. This assembly includes a first drain tube, a second drain tube, a container and a gas tube. The container fluidly couples the first drain tube to the second drain tube. The container is configured to receive fluid from the first drain tube. The gas tube is fluidly coupled with the container. The gas tube is configured to direct gas into the container for propelling the fluid received within the container into the second drain tube.

18 Claims, 11 Drawing Sheets

(56) References Cited

U.S. PATENT DOCUMENTS

| | | |
|---|---|---|
| 8,328,504 B2 | 12/2012 | Russell |
| 9,718,531 B2 | 8/2017 | Gaudreau |
| 10,017,238 B2 | 7/2018 | Leon |
| 10,167,741 B2 | 1/2019 | Lacko |
| 10,301,973 B2 | 5/2019 | Leon |
| 2010/0326049 A1* | 12/2010 | Schmittenberg .......... F02C 7/14 60/266 |
| 2016/0304184 A1 | 10/2016 | Sayn-Urpar |
| 2016/0312707 A1 | 10/2016 | Py |
| 2017/0122128 A1 | 5/2017 | Lacko |
| 2018/0362136 A1 | 12/2018 | Wozniak |
| 2021/0245891 A1* | 8/2021 | Coupard ............ F01M 11/0458 |

\* cited by examiner

FLUID DRAIN SYSTEM FOR AN AIRCRAFT PROPULSION SYSTEM

CROSS-REFERENCE TO RELATED APPLICATIONS

This application claims priority to U.S. Provisional Patent Application No. 62/907,829 filed Sep. 30, 2019, which is hereby incorporated herein by reference in its entirety.

BACKGROUND

1. Technical Field

This disclosure relates generally to an aircraft propulsion system and, more particularly, to a fluid drain system for the aircraft propulsion system.

2. Background Information

A modern aircraft propulsion system includes a gas turbine engine and a drain system for the gas turbine engine. A typical drain system is configured to route leakage fluids away from select components of the gas turbine engine and out of the aircraft propulsion system. Where the select components are arranged within a core compartment of the aircraft propulsion system, the drain system may provide a leakage path that extends out of the core compartment, through a lower bifurcation, and to a drain in an outer nacelle structure. While these known drain systems have various benefits, there is still room in the art for improvement. For example, there is a need in the art for a drain system that can route leakage fluids within an O-duct nacelle; e.g., a nacelle configured without a lower bifurcation. There is a need in the art therefore for improved systems and methods for routing leakage fluids away from components of a gas turbine engine.

SUMMARY OF THE DISCLOSURE

According to an aspect of the present disclosure, an assembly is provided for an aircraft propulsion system. This assembly includes a first drain tube, a second drain tube, a container and a gas tube. The container is between and fluidly couples the first drain tube and the second drain tube. The container is configured to receive fluid from the first drain tube. The gas tube is fluidly coupled with the container. The gas tube is configured to direct gas into the container for propelling the fluid received within the container into the second drain tube.

According to another aspect of the present disclosure, an aircraft propulsion system is provided that includes a nacelle, a gas turbine engine and a drain system. The gas turbine engine is housed within the nacelle. The drain system includes an engine drain tube, a container, a pressure source and an overboard drain tube. The engine drain tube is configured to direct leakage fluid from a component of the gas turbine engine into the container. The pressure source is configured to pressurize the container with pressurized gas such that the leakage fluid within the container is directed into the overboard drain tube and out of the aircraft propulsion system through the overboard drain tube.

According to still another aspect of the present disclosure, another aircraft propulsion system is provided that includes a nacelle, a gas turbine engine, a container, an engine drain tube, an overboard drain tube and a pressure source. The gas turbine engine is housed within the nacelle. The gas turbine engine includes a component. The container is arranged within a compartment between the nacelle and the gas turbine engine. The container is configured with an internal cavity. The engine drain tube is fluidly coupled with the internal cavity. The engine drain tube is configured to direct fluid received from the component into the internal cavity. The overboard drain tube is fluidly coupled with the internal cavity. The pressure source is fluidly coupled with the internal cavity. The pressure source is configured to pressurize the internal cavity such that the fluid within the internal cavity is directed into the overboard drain tube and, for example, thereafter out of the nacelle.

The nacelle may be configured without a lower bifurcation.

The nacelle may be configured without a drain mast for the gas turbine engine extending through a bypass duct.

The first drain tube may be configured as or otherwise include a gas turbine engine drain tube configured to receive the fluid from a component within the aircraft propulsion system.

The second drain tube may be configured as or otherwise include an overboard drain tube configured to direct the fluid out of the aircraft propulsion system.

A gas source may be included and fluidly coupled with the gas tube. The gas source may be configured to direct the gas through the gas tube and into the container.

The gas source may be configured as or otherwise include an inlet configured to receive the gas from a bypass duct of the aircraft propulsion system.

The container may be configured with an internal cavity. A first outlet portion of the first drain tube may project into the internal cavity. In addition or alternatively, a second outlet portion of the gas tube may project into the internal cavity.

The container may be configured to provide a visual line of sight from outside of the container into a cavity within the container while the container is installed within the assembly.

The container may include a drain plug.

The gas may be or include pressurized air. In addition or alternatively, the fluid may be or include at least one of lubricant, coolant or fuel.

A third drain tube and a second container may be included. The second container may fluidly couple the third drain tube to the second drain tube. The second container may be configured to receive second fluid from the third drain tube. The gas tube may be further configured to direct the gas into the second container for propelling the second fluid received within the second container into the second drain tube.

The container and the second container may be fluidly coupled in parallel between the gas tube and the second drain tube.

The container may not be fluidly coupled with the third drain tube. The second container may also or alternatively not be fluidly coupled with the first drain tube.

The first drain tube may slope gravitationally downward to the container.

The second drain tube may slope gravitationally upward away from the container.

A nozzle may be included and arranged within the container. The nozzle may be configured to direct the gas from the gas tube into a cavity within the container.

A funnel may be included and arranged within the container. The funnel may fluidly couple the cavity within the container to the second drain tube. The nozzle may be configured to direct the gas towards the funnel.

A gas turbine engine core and a nacelle inner structure may be included. The nacelle inner structure may house the gas turbine engine core. The container may be arranged within a compartment between the nacelle inner structure and the gas turbine engine core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
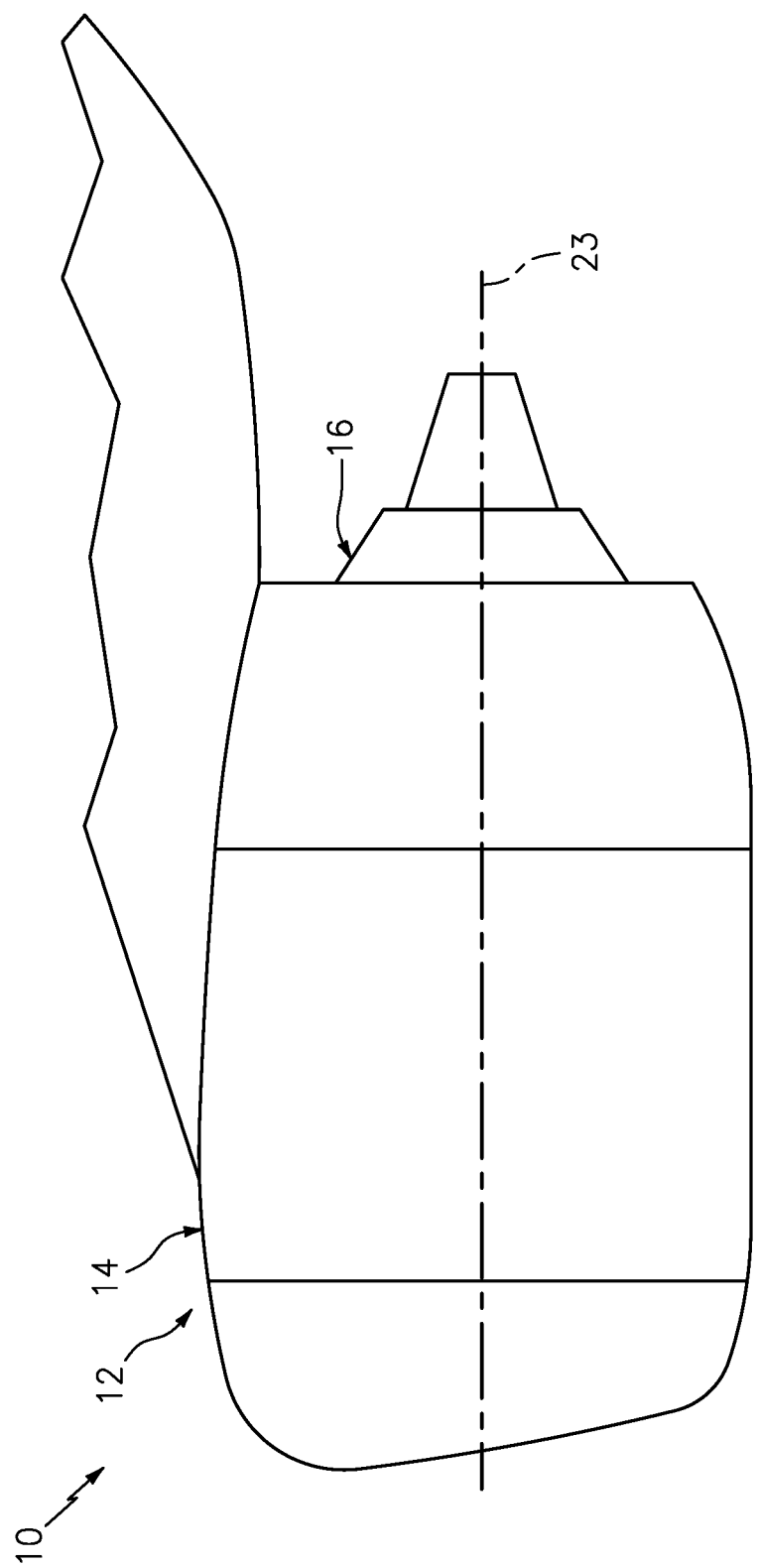
FIG. 1 is a side illustration of an aircraft propulsion system.

FIG. 1 illustrates an aircraft propulsion system 10 for an aircraft such as, but not limited to, a commercial airliner or a cargo plane. The propulsion system 10 includes a nacelle 12 and a gas turbine engine 13 (see FIG. 3). This gas turbine engine 13 may be configured as a high-bypass turbofan engine. Alternatively, the gas turbine engine 13 may be configured as any other type of gas turbine engine capable of propelling the aircraft during flight.

The nacelle 12 is configured to house and provide an aerodynamic cover for the gas turbine engine 13. The nacelle 12 of FIG. 1 includes a nacelle outer structure 14 and a nacelle inner structure 16, which inner structure 16 may sometimes be referred to as an inner fixed structure (IFS).

Figure 2:
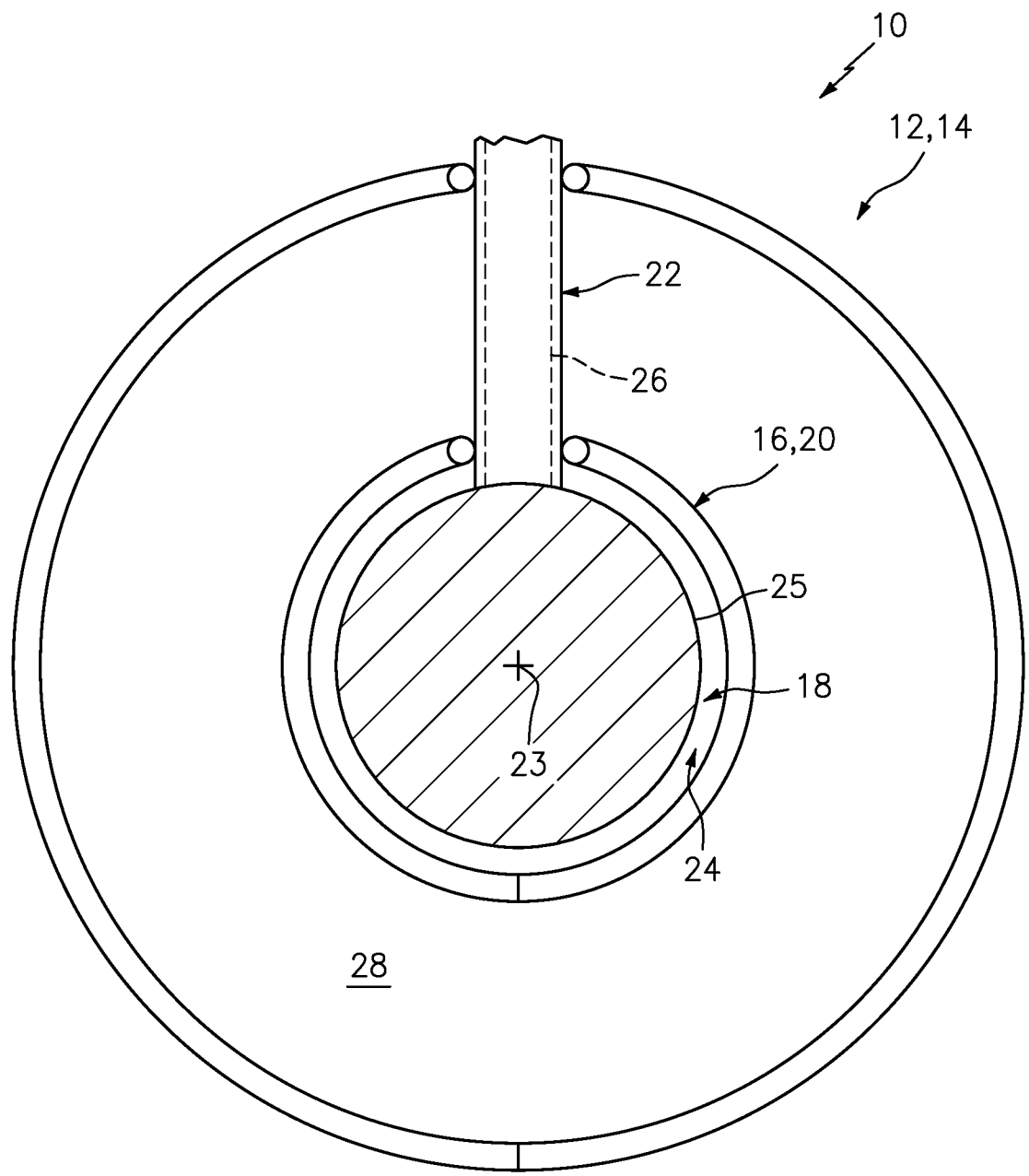
FIG. 2 is a cross-sectional illustration of the aircraft propulsion system with cowl doors in a closed position.

Referring to FIG. 2, the inner structure 16 covers a core 18 of the gas turbine engine 13, which engine core 18 may include a compressor section, a combustor section and a turbine section. The inner structure 16 includes a core cowl 20 (e.g., an inner barrel) and at least one bifurcation structure 22; e.g., an upper bifurcation cowl. The core cowl 20 may be a generally cylindrical and/or barrel-shaped cowl. The core cowl 20 of FIG. 2, for example, extends circumferentially around and axially along the engine core 18 and an axial centerline 23 of the aircraft propulsion system 10 and/or its gas turbine engine 13, which centerline 23 may be coaxial with a rotational axis of the gas turbine engine 13. The core cowl 20 at least partially forms an internal compartment 24 (e.g., a core compartment) within the nacelle 12. This internal compartment 24 extends radially between the core cowl 20 and a case 25 of the engine core 18; see also FIG. 3. The internal compartment 24 may thereby provide a space in which one or more auxiliary systems for the gas turbine engine 13 may be housed. The bifurcation structure 22 provides an aerodynamic housing for a fixed structure such as a pylon 26, which pylon 26 mounts the aircraft propulsion system 10 to another component of the aircraft such as, but not limited to, a wing or a fuselage of the aircraft. The bifurcation structure 22 extends radially between the core cowl 20 and the outer structure 14.

Figure 3:
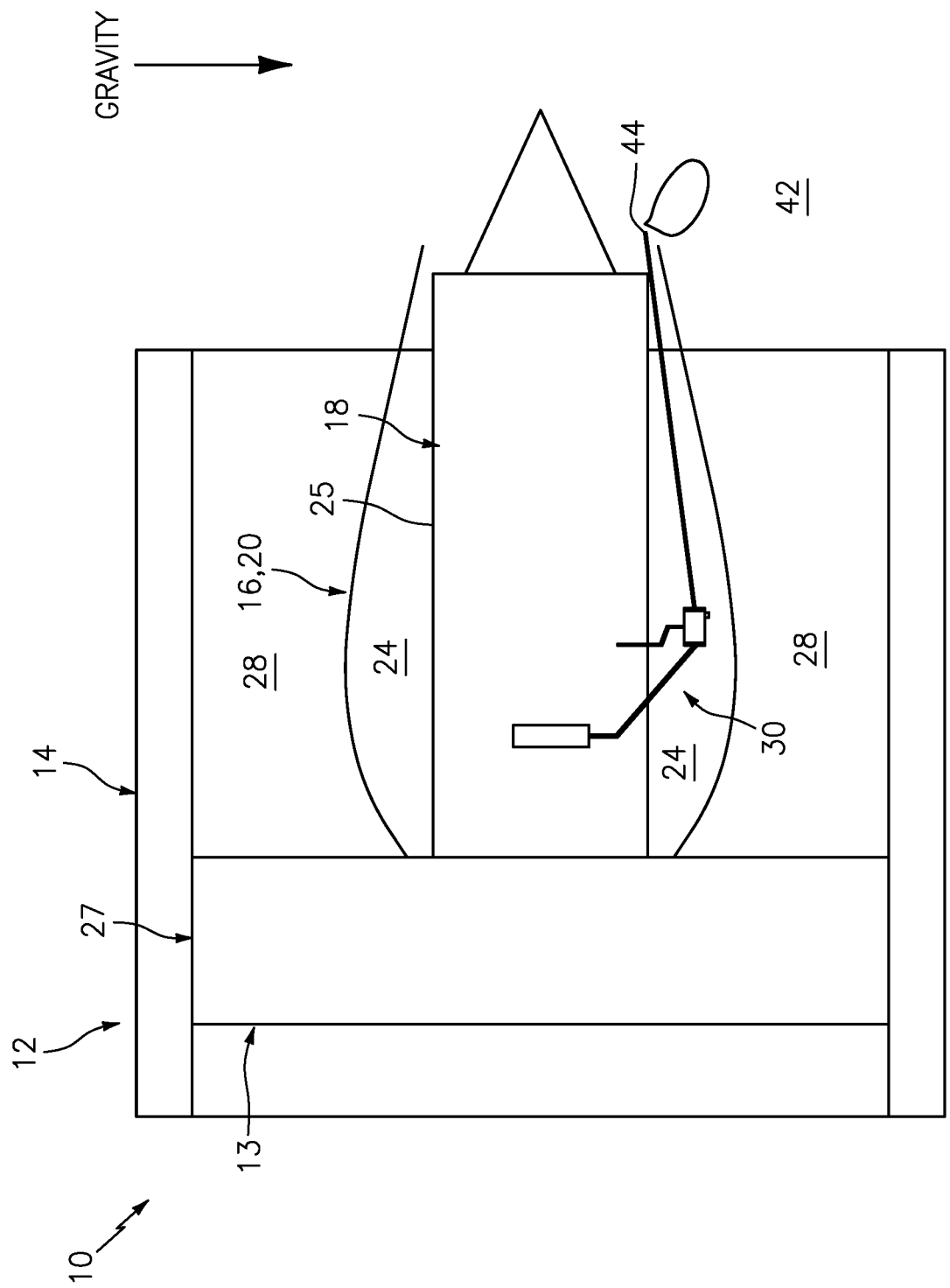
FIG. 3 is a side schematic illustration of the aircraft propulsion system configured with a drain system.

Referring to FIG. 3, the outer structure 14 covers a fan section 27 of the gas turbine engine 13. The outer structure 14 covers at least a forward portion of the inner structure 16 and its core cowl 20 so as to form a bypass duct and an associated bypass flowpath 28 radially between the structures 14 and 16. The outer structure 14 may also be configured with a thrust reverser for redirecting airflow from the bypass flowpath 28 out of the nacelle 12 in a forward and/or outward direction. The present disclosure, however, is not limited to the foregoing exemplary general nacelle configuration.

Briefly, the bypass duct of FIG. 2 is configured as an O-Duct. The term "O-duct" may describe a duct through which only a single bifurcation extends between and connects a nacelle outer structure and a nacelle inner structure. By contrast, the term "C-Duct" or "D-duct" may describe a duct through which two bifurcations (e.g., an upper bifurcation and a lower bifurcation) extend between and connect a nacelle outer structure and a nacelle inner structure. Of course, although the exemplary duct shown in FIG. 2 is an O-duct, the present disclosure is not limited to any particular duct configurations.

Referring to FIG. 3, the aircraft propulsion system 10 also includes a drain system 30. This drain system 30 may be one of the auxiliary systems for the gas turbine engine 13 that is at least partially (or completely) housed within the internal compartment 24, the core cowl 20 and/or the inner structure 16. The drain system 30 of FIG. 4 includes an engine drain tube 32, an overboard drain tube 34, a pressure source 36 and a container 38.

The engine drain tube 32 is configured as a fluid conduit with at least one internal passage (e.g., a bore) for flowing fluid therethrough. The engine drain tube 32, for example, may be or include a length of hose, a length of pipe and/or any other suitable tubular body. The engine drain tube 32 is fluidly coupled with one or more components of the gas turbine engine 13. The engine drain tube 32 of FIG. 4, for example, may be fluidly coupled with a turbine engine component 40 such as, but not limited to, a housing for a bearing, a gear system, a fuel system component, a lubrication system component and/or a cooling system component. The engine drain tube 32 is thereby operable to receive fluid from the turbine engine component 40 when, for example, that fluid is leaking within or about the turbine engine component 40. The fluid, for example, may be leakage fluid (e.g., liquid) such as, but not limited to, coolant, lubricant and/or fuel. It is worth noting, the turbine engine component 40 of FIG. 4 may be configured as single component or may alternatively include a plurality of components; e.g., multiple components from the same or different engine systems. Where the turbine engine component 40 includes a plurality of components, the engine drain tube 32 may be fluidly coupled with some or each of those components through, for example, at least one coupling device (e.g., a manifold, funnel, etc.) arranged fluidly between the respective components and the engine drain tube 32.

The overboard drain tube 34 is configured as a fluid conduit with at least one internal passage (e.g., a bore) for flowing fluid therethrough. The overboard drain tube 34, for example, may be or include a length of hose, a length of pipe and/or any other suitable tubular body. The overboard drain tube 34 is fluidly coupled with an exterior environment 42 to the aircraft propulsion system 10 as shown, for example, in FIG. 3. The overboard drain tube 34 of FIG. 3, for example, has an outlet 44 that is outboard of and/or is at (e.g., in, adjacent or proximate) an outer surface of the inner structure 16; e.g., at an outer surface of the core cowl 20.

Figure 4:
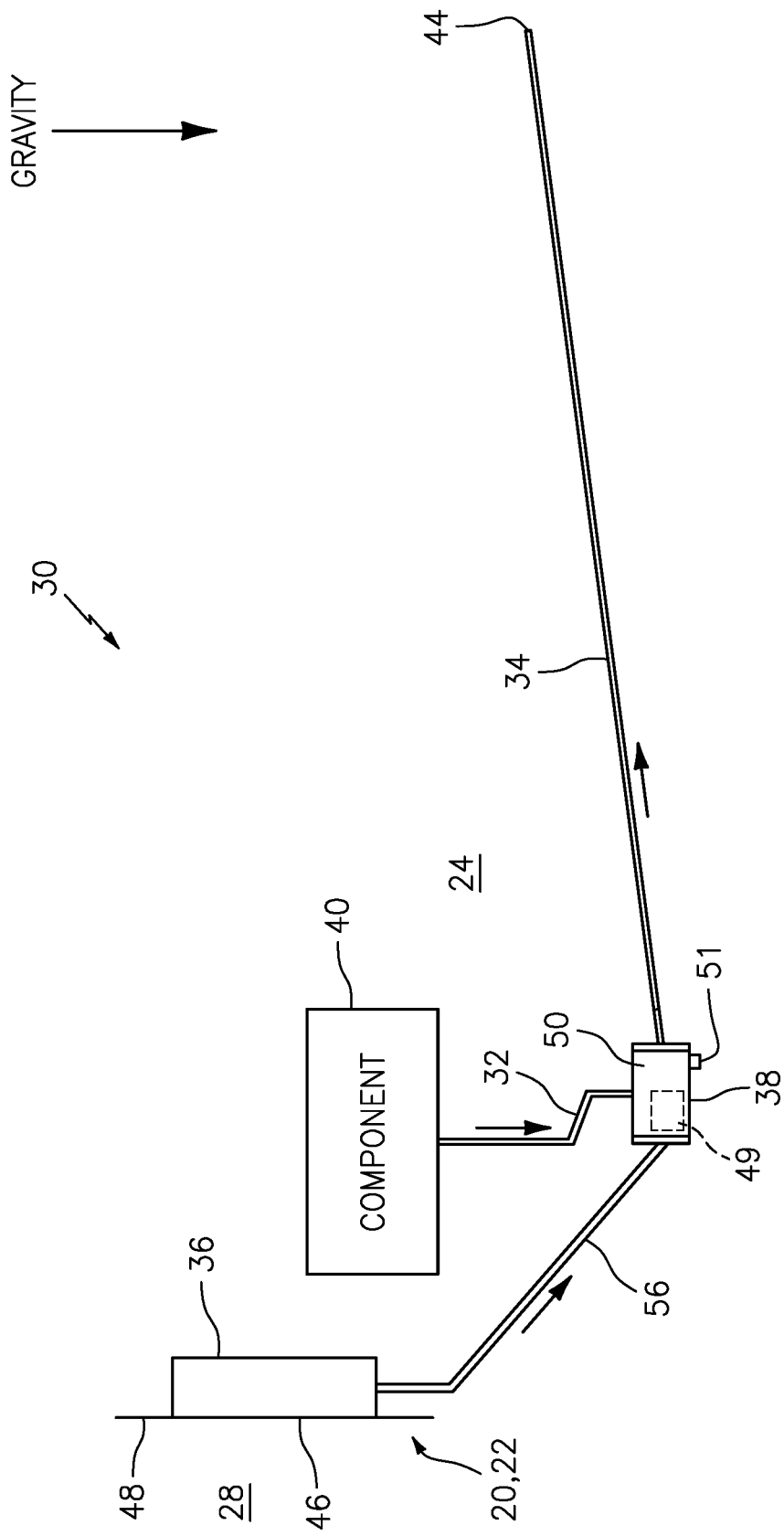
FIG. 4 is a schematic illustration of the drain system.

The pressure source 36 of FIG. 4 is configured to generate, flow or otherwise provide pressurized fluid; e.g., gas such as pressurized air. The pressure source 36, for example, may be configured as an inlet 46; e.g., an inlet orifice and/or an inlet duct. This inlet 46 may be fluidly coupled with and thereby receive the pressurized fluid from the bypass flowpath 28. For example, the inlet 46 may be configured in a panel 48 forming a peripheral boundary of the bypass flowpath 28; e.g., a panel of the bifurcation structure 22 or a panel of the core cowl 20. Alternatively, the inlet 46 may receive the pressurized fluid from within the gas turbine engine 13 (e.g., a bleed from the compressor section), from outside of the outer structure 14/the nacelle 12, or elsewhere.

The container 38 is configured as a pressure vessel such as, but not limited to, a bottle (e.g., an environmental bottle), a canister, a cylinder, a tank, etc. The container 38 may be configured to provide a visual line of sight from outside of the container 38 into an internal cavity 50 within the container 38 while, for example, the container 38 is installed with the aircraft propulsion system 10. The container 38, for example, may be configured with a transparent (e.g., clear) or semi-transparent sidewall or window 49 to enable an observer (e.g., maintenance personal) to visually determined whether there is any fluid within the internal cavity 50, for example, without removing the container 38 or accessing the cavity 50. The container 38 may also or alternatively include one or more other features for determining whether there is any fluid within the cavity 50 such as, but not limited to, a drain plug 51.

Figure 5:
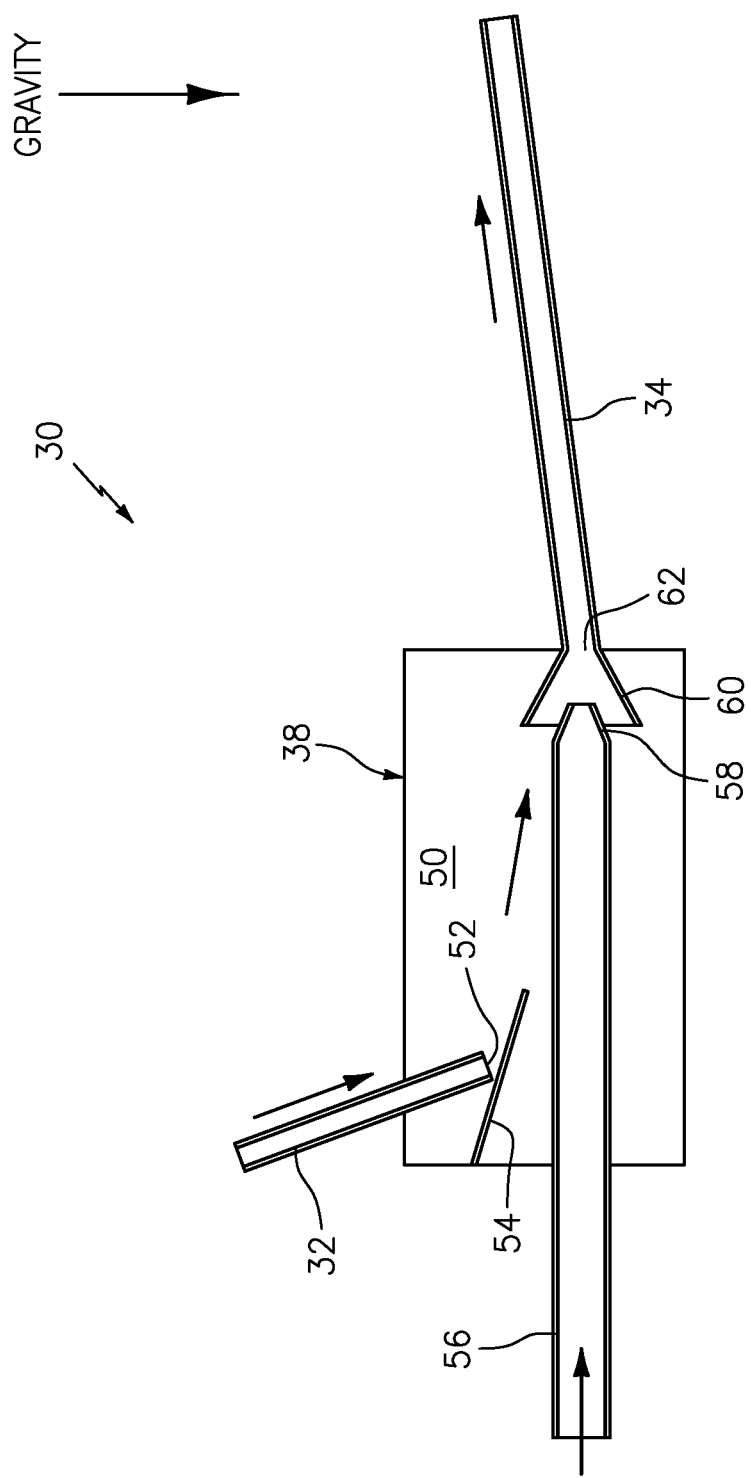
FIG. 5 is a schematic illustration of a portion of the drain system including a container.

The container 38 is fluidly coupled with the engine drain tube 32, the pressure source 36 and the overboard drain tube 34. An outlet portion of the engine drain tube 32 of FIG. 5, for example, projects into the interior cavity 50 of the container 38. An outlet 52 of the engine drain tube 32, at a distal end of the tube 32 and its outlet portion, is positioned adjacent and gravitationally above a baffle 54. In the embodiment of FIG. 5, at least a portion or an entirety of the engine drain tube 32 slopes/extends in a gravitationally downward direction from the turbine engine component 40 to the container 38. Note, the direction of gravity may be set when the aircraft is at level flight and/or on the ground, or when the aircraft propulsion system 10 is horizontal and/or non-operational. In some embodiments, a portion of the engine drain tube 32 may also extend horizontally; e.g., parallel to a horizon line/perpendicular to gravity. However, typically no portion of the engine drain tube 32 slopes/extends in a gravitationally upward direction as the tube 32 extends towards the container 38. Thus, even when the aircraft propulsion system 10 is non-operational (e.g., the aircraft is parked at a gate), fluid leaking from the turbine engine component 40 (see FIG. 4) may flow through the engine drain tube 32 and into the container 38.

The pressure source 36 of FIG. 4 is fluidly coupled to the container 38 through at least a pressure fluid tube 56; e.g., a gas/air tube. This pressure fluid tube 56 is configured as a fluid conduit with at least one internal passage (e.g., a bore) for flowing fluid therethrough. The pressure fluid tube 56, for example, may be or include a length of hose, a length of pipe and/or any other suitable tubular body.

An outlet portion of the pressure fluid tube 56 of FIG. 5 projects into the interior cavity 50 of the container 38 to, for example, a nozzle 58. This nozzle 58 is configured to direct the pressurized fluid into the internal cavity 50 and, for example, to/towards a funnel 60. This funnel 60 is attached to or otherwise fluid coupled with an inlet 62 of the overboard drain tube 34. With this configuration, the pressurized fluid received from the pressure source 36 is operable to pressurize the internal cavity 50 and thereby generate a vacuum as the pressurized fluid is discharged from the container 38 through the overboard drain tube 34. This vacuum may cause at least a portion or all of the fluid (e.g., leakage fluid) received from the engine drain tube 32 to also be discharged from the container 38 through the overboard drain tube 34 and exhausted/expelled into the exterior environment 42. The pressurized fluid may also prevent a backflow from occurring through the overboard drain tube 34.

Figure 5B:
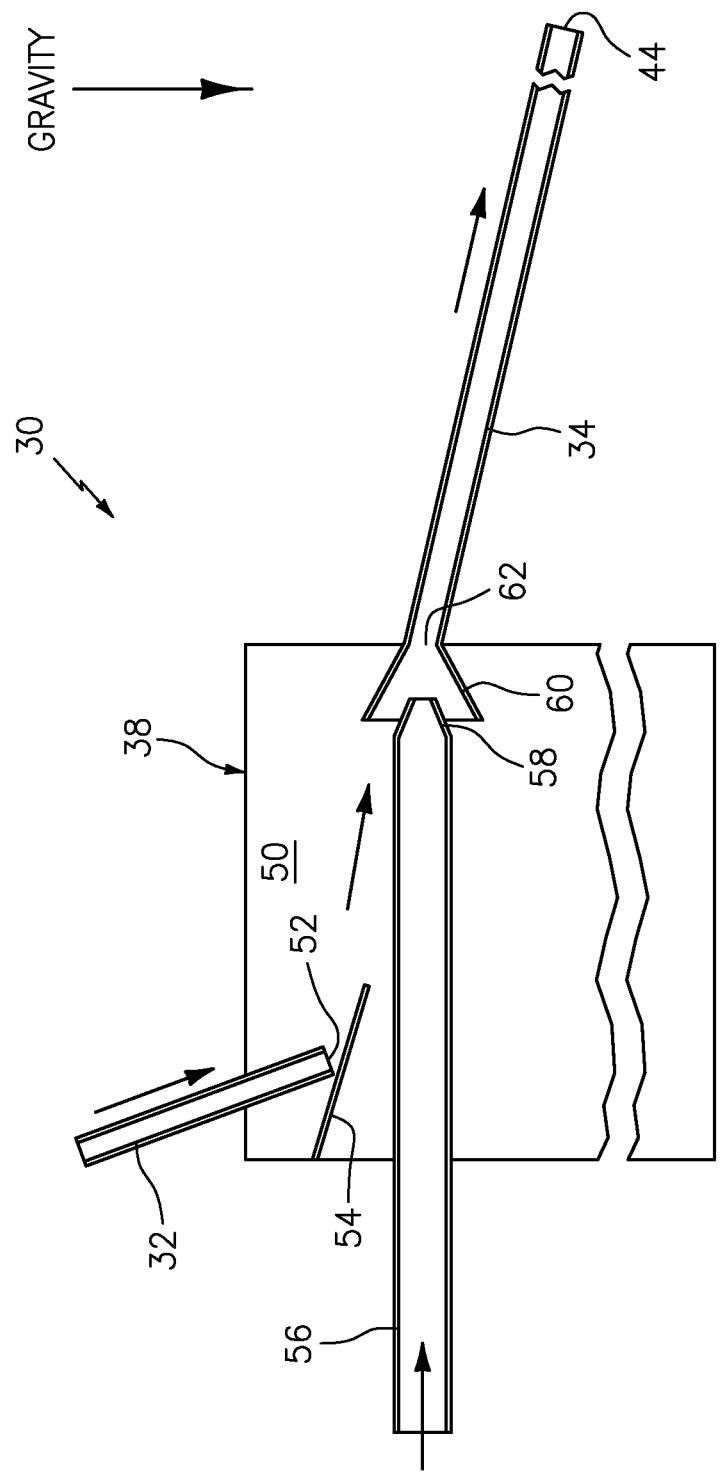
FIG. 5B is a schematic illustration of a portion of the drain system with a downward sloped overboard drain tube.

In the embodiment of FIG. 5, at least a portion or an entirety of the overboard drain tube 34 slopes/extends in a gravitationally upward direction away from the container 38 and to its outlet 44 (see FIG. 4). In some embodiments, a portion of the overboard drain tube 34 may also extend horizontally; e.g., parallel to a horizon line/perpendicular to gravity. However, typically no portion of the overboard drain tube 34 slopes/extends in a gravitationally downward direction as the tube 34 extends towards the outlet 44. Thus, when the aircraft propulsion system 10 is non-operational, fluid leaking from the turbine engine component 40 into the container 38 may remain in the container 38 for collection. Thus, the fluid may not drip onto the outer structure 14 nor the ground. Of course, in other embodiments, a portion or all of the overboard drain tube 34 may slope/extend in the gravitationally downward direction as the tube 34 extends towards the outlet 44 where, for example, a coupling between the overboard drain tube 34 and the container 38 is at (e.g., on, adjacent or proximate) a gravitational top end of the container 38; e.g., see FIG. 5B.

Figure 6:
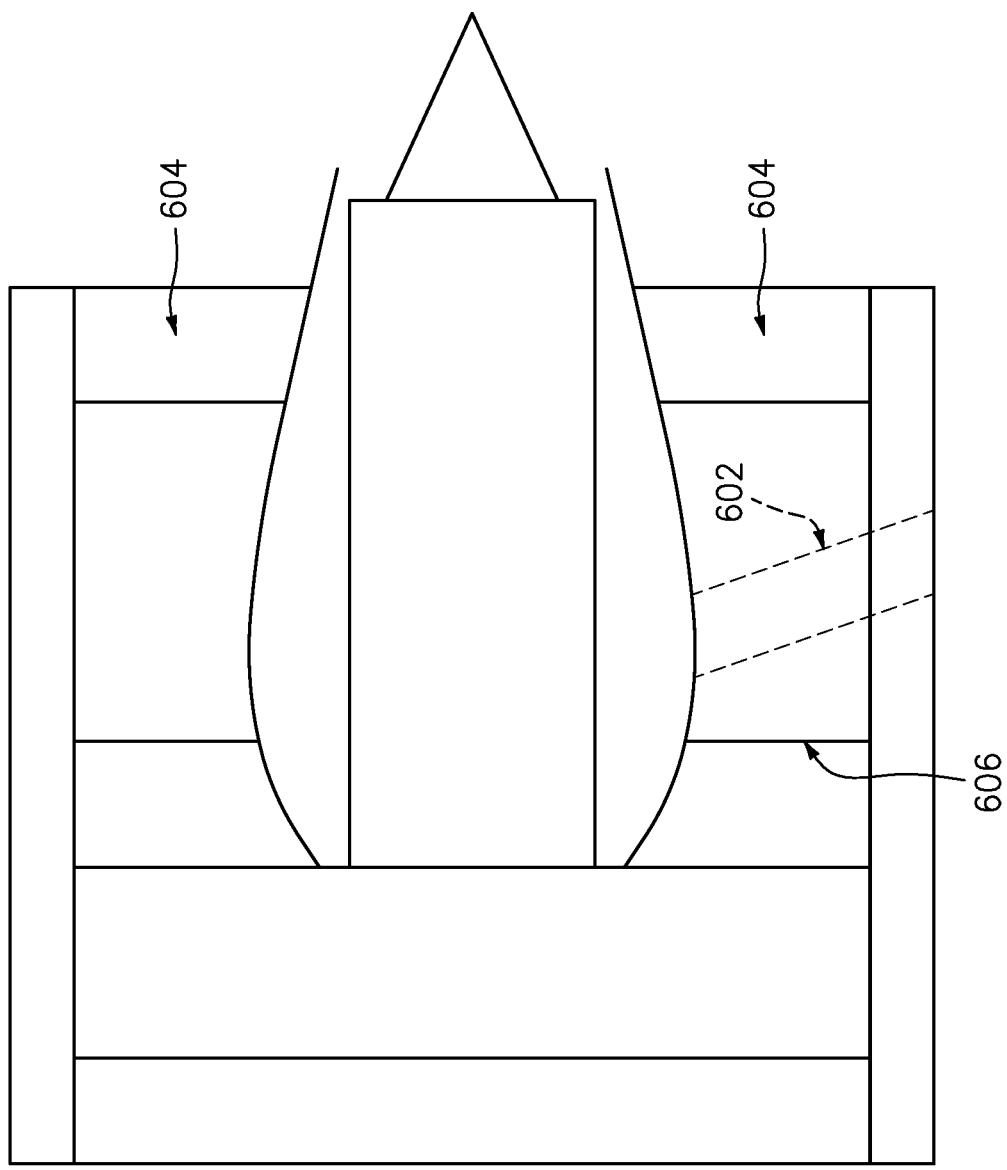
FIG. 6 is a schematic illustration of another aircraft propulsion system.

Referring to FIG. 3, the drain system 30 enables the aircraft propulsion system 10 to be configured without a drain mast extending through the bypass flowpath 28. The drain system 30 of FIG. 3 also enables the aircraft propulsion system 10 to be configured without a lower bifurcation structure. By contrast, FIG. 6 illustrates an aircraft propulsion system 600 that includes a drain mast 602 extending through a bypass duct 604. The aircraft propulsion system 600 of FIG. 6 also includes a lower bifurcation structure 606 that provides an aerodynamic cover for the drain mast 602. Such a lower bifurcation structure 606 may disrupt flow through the bypass duct 604 and, thus, reduce propulsion system efficiency. Inclusion of the drain mast 602 may also require use of complex and/or expensive seal systems. Furthermore, a long drain mast may be subject to damage during maintenance when nacelle doors are open. Of course, the drain system 30 of the present disclosure may alternatively be configured with a C-duct or D-duct nacelle in order to provide the propulsion system with, for example, the fluid collection capability described above.

Figure 7:
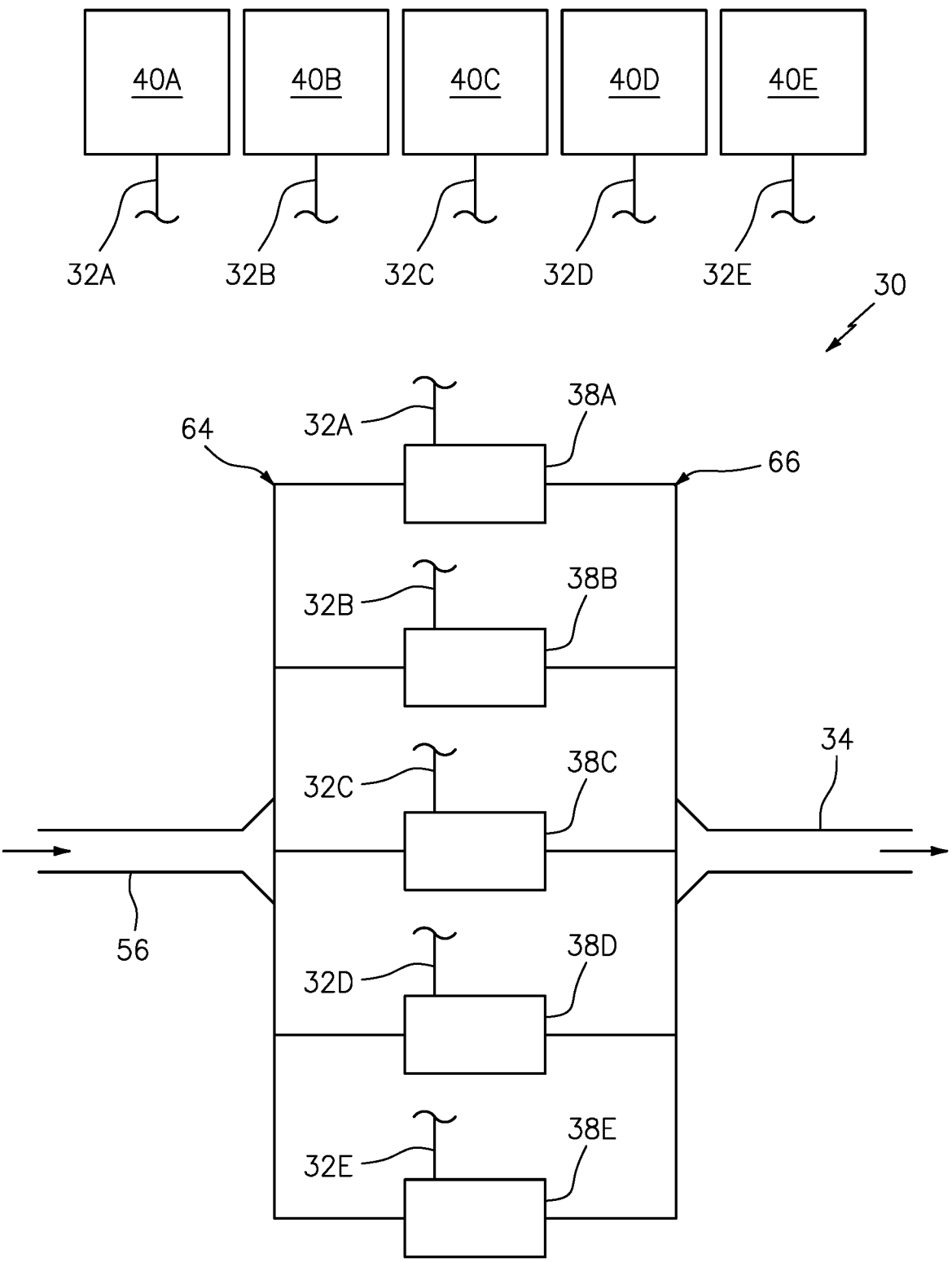
FIG. 7 is a schematic illustration of a portion of a drain system with parallel containers.
Figure 8:
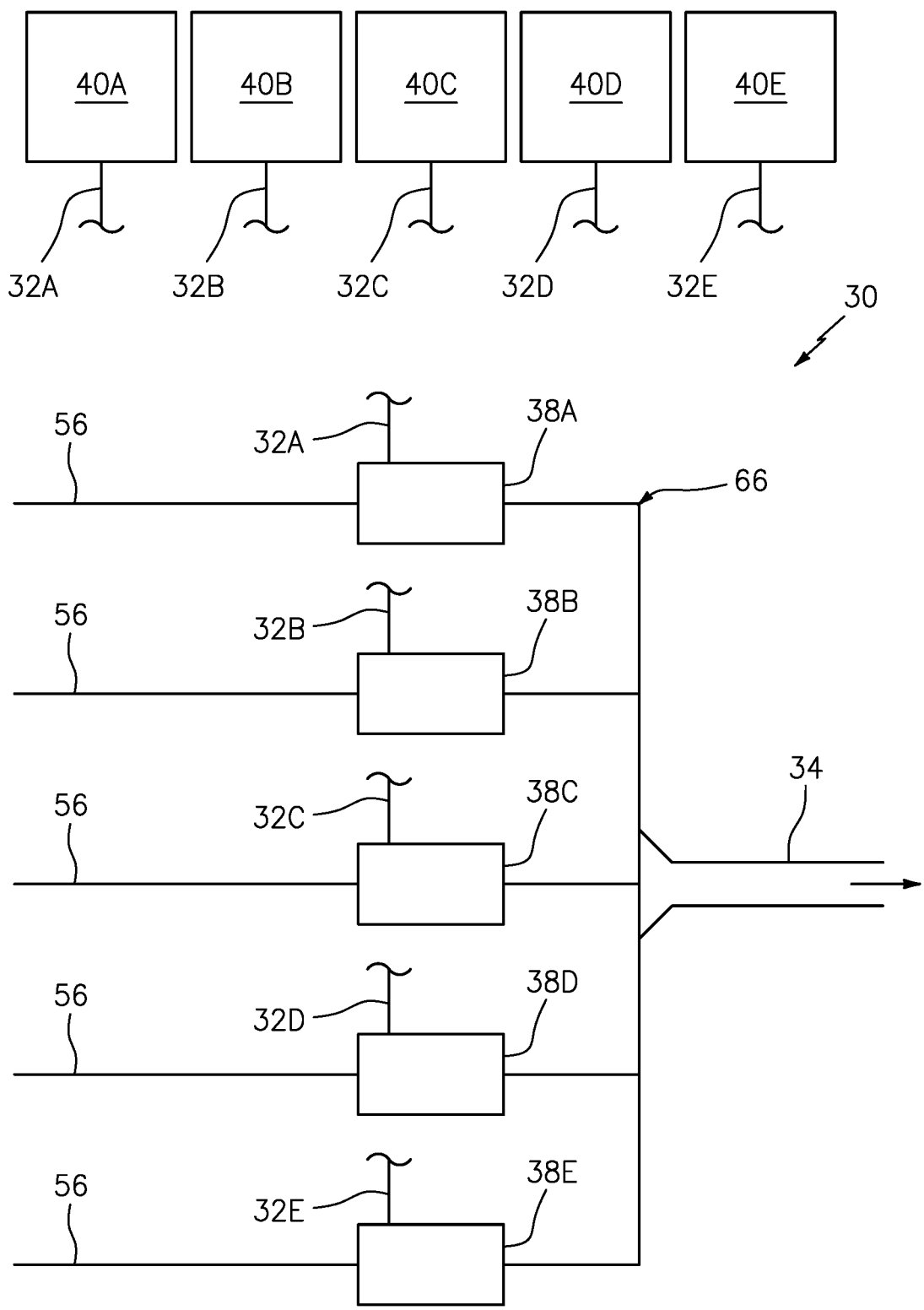
FIG. 8 is a schematic illustration of a portion of another drain system with multiple containers.
Figure 9:
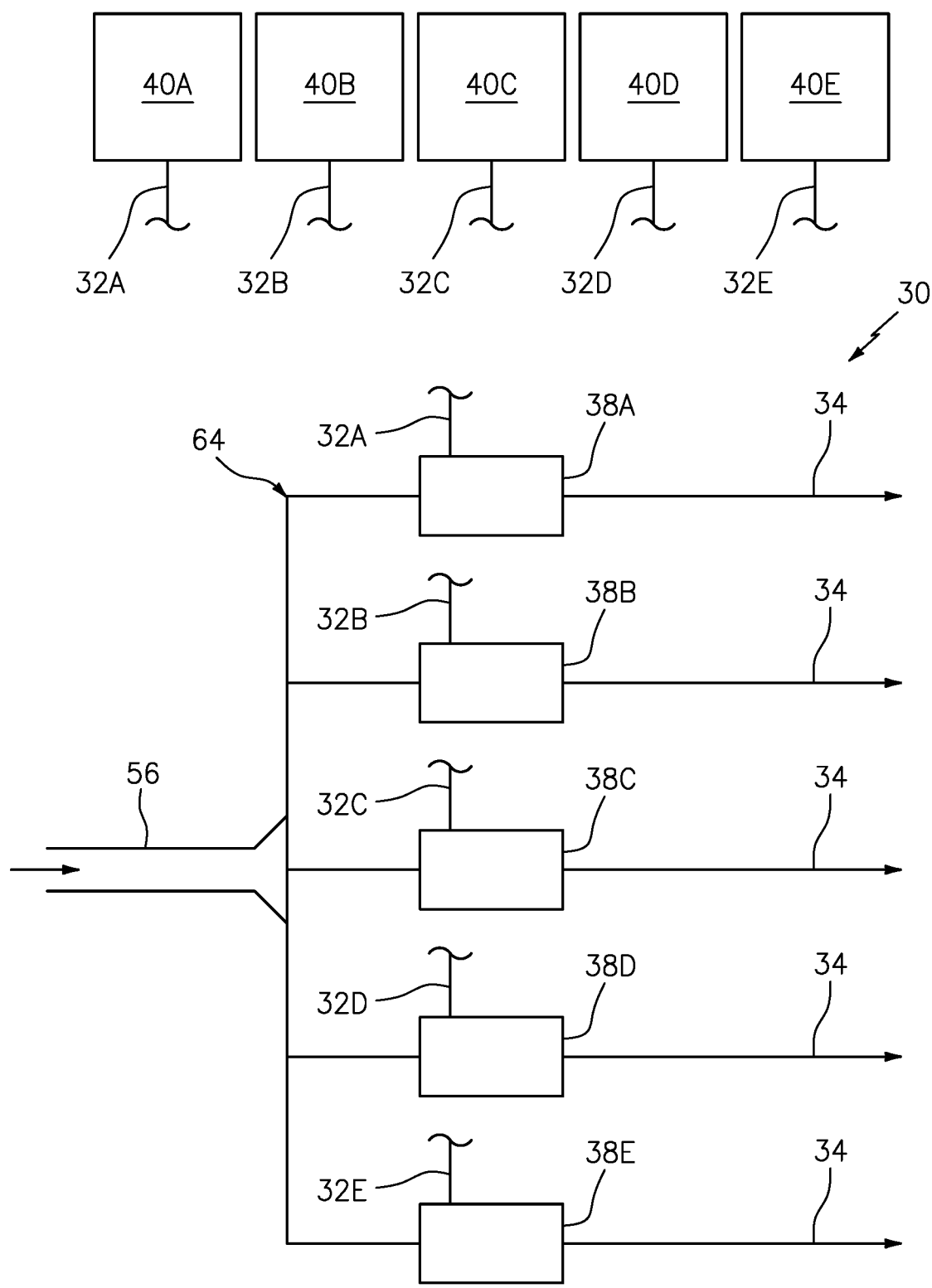
FIG. 9 is a schematic illustration of a portion of another drain system with multiple containers.
Figure 10:
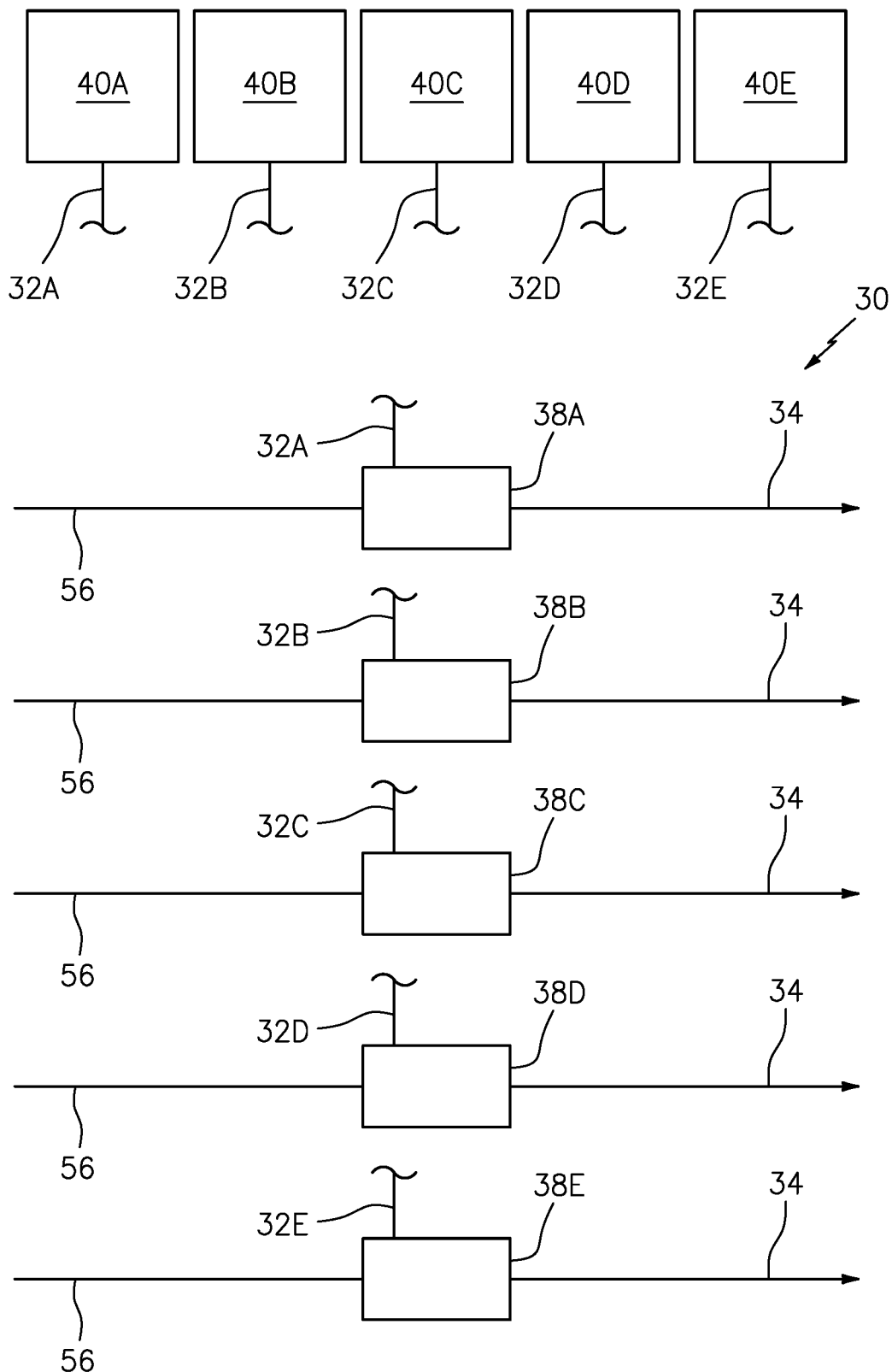
FIG. 10 is a schematic illustration of a portion of still another drain system with multiple containers.

Referring to FIG. 7, in some embodiments, the drain system 30 may include a plurality of the containers 38A-E (generally referred to as "38"). Each of these containers 38 may be fluidly coupled to a discrete engine drain tube 32A-E (generally referred to as "32") such that each container 38 is operable to receive respective fluid (e.g., leakage fluid) from a different turbine engine component 40A-E (generally referred to as "40"). Thus, if one of the containers 38 (e.g., 38A) contains fluid during inspection, the inspector may determine the associated turbine engine component 40 (e.g., 40A) has a leak. The containers 38, however, may be fluidly coupled in parallel (e.g., via a first manifold 64 and a second manifold 66) between the pressure fluid tube 56 and the overboard drain tube 34. However, each container 38 may only be fluidly coupled with and/or downstream of a single respective one of the engine drain tubes 32. For example, the container 38A is fluidly coupled with and downstream of the engine drain tube 32A, but not fluidly coupled with and/or downstream of any of the other engine drain tubes 32B-32E. Of course, in other embodiments, one or more of the containers 38 may alternatively be configured with its own dedicated pressure fluid tube 56 (see FIGS. 8 and 10) and/or its own dedicated overboard drain tube 34 (see FIGS. 9 and 10).

The drain system 30 of the present disclosure may be a self-contained system. Thus, the drain system 30 may not impact nacelle leakage or Firex bottle sizing. The drain system 30 may also operate at various aircraft orientations given the use of the pressurized fluid.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An aircraft propulsion system, comprising:
    a nacelle including a nacelle outer structure, a nacelle inner structure and a bypass flowpath formed by and disposed radially between the nacelle outer structure and the nacelle inner structure;
    a gas turbine engine including a fan section and an engine core, the fan section covered by the nacelle outer structure, and the engine core covered by the nacelle inner structure; and
    a drain system housed within the nacelle inner structure, the drain system including
        a first drain tube;
        a second drain tube;
        a third drain tube;
        a container between and fluidly coupling the first drain tube and the second drain tube, the container configured to receive fluid from the first drain tube;
        a second container fluidly coupling the third drain tube to the second drain tube, the second container configured to receive second fluid from the third drain tube; and
        a gas tube fluidly coupled with the container and the second container, the gas tube configured to direct gas into the container for propelling the fluid received within the container into the second drain tube, and the gas tube further configured to direct the gas into the second container for propelling the second fluid received within the second container into the second drain tube.

2. The aircraft propulsion system of claim 1, wherein the first drain tube comprises a gas turbine engine drain tube configured to receive the fluid from a component within the aircraft propulsion system.

3. The aircraft propulsion system of claim 1, wherein the second drain tube comprises an overboard drain tube configured to direct the fluid out of the aircraft propulsion system.

4. The aircraft propulsion system of claim 1, further comprising a gas source fluidly coupled with the gas tube, the gas source configured to direct the gas through the gas tube and into the container.

5. The aircraft propulsion system of claim 4, wherein the gas source comprises an inlet configured to receive the gas from a bypass duct the bypass flowpath of the aircraft propulsion system.

6. The aircraft propulsion system of claim 1, wherein
    the container is configured with an internal cavity;
    a first outlet portion of the first drain tube projects into the internal cavity; and
    a second outlet portion of the gas tube projects into the internal cavity.

7. The aircraft propulsion system of claim 1, wherein the container is configured to provide a visual line of sight from outside of the container into a cavity within the container while the container is installed within the assembly.

8. The aircraft propulsion system of claim 1, wherein the container includes a drain plug.

9. The aircraft propulsion system of claim 1, wherein at least one of
    the gas comprises pressurized air; or
    the fluid comprises at least one of lubricant, coolant or fuel.

10. The aircraft propulsion system of claim 1, wherein the container and the second container are fluidly coupled in parallel between the gas tube and the second drain tube.

11. The aircraft propulsion system of claim 1, wherein the first drain tube slopes gravitationally downward to the container.

12. The aircraft propulsion system of claim 1, wherein the second drain tube slopes gravitationally upward away from the container.

13. The aircraft propulsion system of claim 1, further comprising:
    a nozzle arranged within the container;
    the nozzle configured to direct the gas from the gas tube into a cavity within the container.

14. The aircraft propulsion system of claim 13, further comprising:
    a funnel arranged within the container;
    the funnel fluidly coupling the cavity within the container to the second drain tube;
    wherein the nozzle is configured to direct the gas towards the funnel.

15. The aircraft propulsion system of claim 1, wherein the container is arranged within a compartment between the nacelle inner structure and the engine core.

16. An aircraft propulsion system, comprising:
    a nacelle;
    a turbofan gas turbine engine housed within the nacelle, the turbofan gas turbine engine comprising an engine core; and
    a drain system comprising an engine drain tube, a second engine drain tube, a container, a second container, a pressure source and an overboard drain tube;

the engine drain tube configured to direct leakage fluid from a component of the turbofan gas turbine engine into the container;
the second engine drain tube configured to direct second leakage fluid from a second component of the turbofan gas turbine engine into the second container;
the container arranged within a compartment partially formed by the engine core;
the second container arranged within the compartment;
the pressure source configured to pressurize the container with pressurized gas such that the leakage fluid within the container is directed into the overboard drain tube and out of the aircraft propulsion system through the overboard drain tube; and
the pressure source configured to pressurize the second container with the pressurized gas such that the second leakage fluid within the second container is directed into the overboard drain tube and out of the aircraft propulsion system through the overboard drain tube.

17. The aircraft propulsion system of claim 16, further comprising a bypass flowpath configured without a lower bifurcation.

18. The aircraft propulsion system of claim 16, further comprising a bypass flowpath configured without a drain mast for the turbofan gas turbine engine extending through the bypass flowpath.

\* \* \* \* \*